(12) United States Patent
Martino et al.

(10) Patent No.: US 8,629,349 B2
(45) Date of Patent: Jan. 14, 2014

(54) ELECTRICAL ASSEMBLY AND ADAPTER FOR WIRING DEVICE

(75) Inventors: Brian T. Martino, Hope Valley, RI (US); Nathaniel L. Herring, Mystic, CT (US)

(73) Assignee: Hubbell Incorporated, Shelton, CT (US)

( * ) Notice: Subject to any disclaimer, the term of this patent is extended or adjusted under 35 U.S.C. 154(b) by 201 days.

(21) Appl. No.: 12/847,222

(22) Filed: Jul. 30, 2010

(65) Prior Publication Data

US 2012/0026714 A1 Feb. 2, 2012

(51) Int. Cl.
*H02G 3/14* (2006.01)
(52) U.S. Cl.
USPC ............... 174/66; 174/67; 174/535; 174/559; 361/730; 361/809
(58) Field of Classification Search
USPC ................ 174/50, 535, 559, 480, 66, 67; 312/223.1, 223.2, 223.3, 223.6; 361/600, 724, 730, 752, 809; 220/3.94, 220/241, 3.2, 3.3, 3.4, 3.5, 3.6, 3.7, 3.8, 3.9, 220/3.92
See application file for complete search history.

(56) References Cited

U.S. PATENT DOCUMENTS

| | | | |
|---|---|---|---|
| 2,180,598 A | 11/1939 | Mahan | |
| 2,514,176 A | 7/1950 | Borkowski | |
| 2,703,662 A | 3/1955 | Meyer | |
| 2,992,754 A | 7/1961 | Grimes | |
| 3,101,922 A | 8/1963 | Moody et al. | |
| 3,446,467 A | 5/1969 | Bailey et al. | |
| 3,963,204 A | 6/1976 | Liss | |
| 4,183,486 A | 1/1980 | Esoldi | |
| 4,599,485 A * | 7/1986 | Smolik | 174/57 |
| 4,613,728 A * | 9/1986 | Lathrop | 174/53 |
| 4,847,444 A | 7/1989 | Holland | |
| 5,238,426 A | 8/1993 | Arnett | |
| 5,239,132 A | 8/1993 | Bartow | |
| 5,451,021 A | 9/1995 | Ripley | |
| 6,244,544 B1 | 6/2001 | Kitscha et al. | |
| 6,369,322 B1 | 4/2002 | Gretz | |
| 6,376,770 B1 * | 4/2002 | Hyde | 174/58 |
| 7,009,109 B1 | 3/2006 | Omura et al. | |
| 7,439,443 B2 | 10/2008 | Dinh | |
| 8,072,779 B1 * | 12/2011 | Haberek | 361/825 |

* cited by examiner

*Primary Examiner* — Hoa C Nguyen
*Assistant Examiner* — Binh Tran
(74) *Attorney, Agent, or Firm* — Garrett V. Davis; Mark S. Bicks; Alfred N. Goodman

(57) ABSTRACT

A recessed box is adapted for mounting one or more electrical devices having an adapter. To accommodate electrical devices of different sizes, the adapter is provided that is coupled to the opening in the recessed box. The adapter has a frame with a central opening to receive the selected electrical device. The frame has one or more removable tabs to enlarge the dimension of the central opening to accommodate larger electrical devices. An electrical device, such as a low voltage wiring device, is coupled to the removable tabs. The tabs are removed to receive a larger electrical device, such as an electrical junction box, that is coupled to the frame.

18 Claims, 10 Drawing Sheets

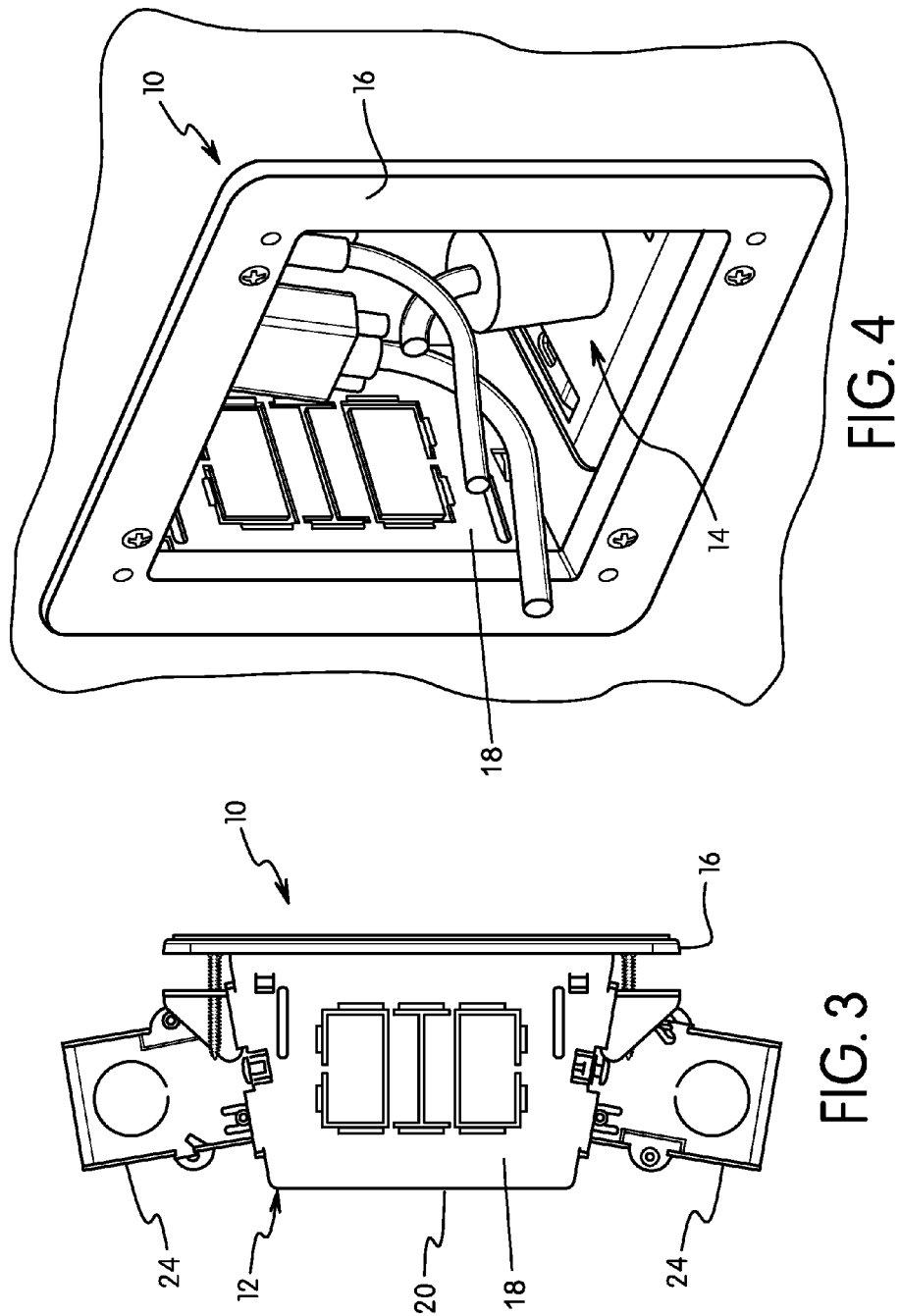

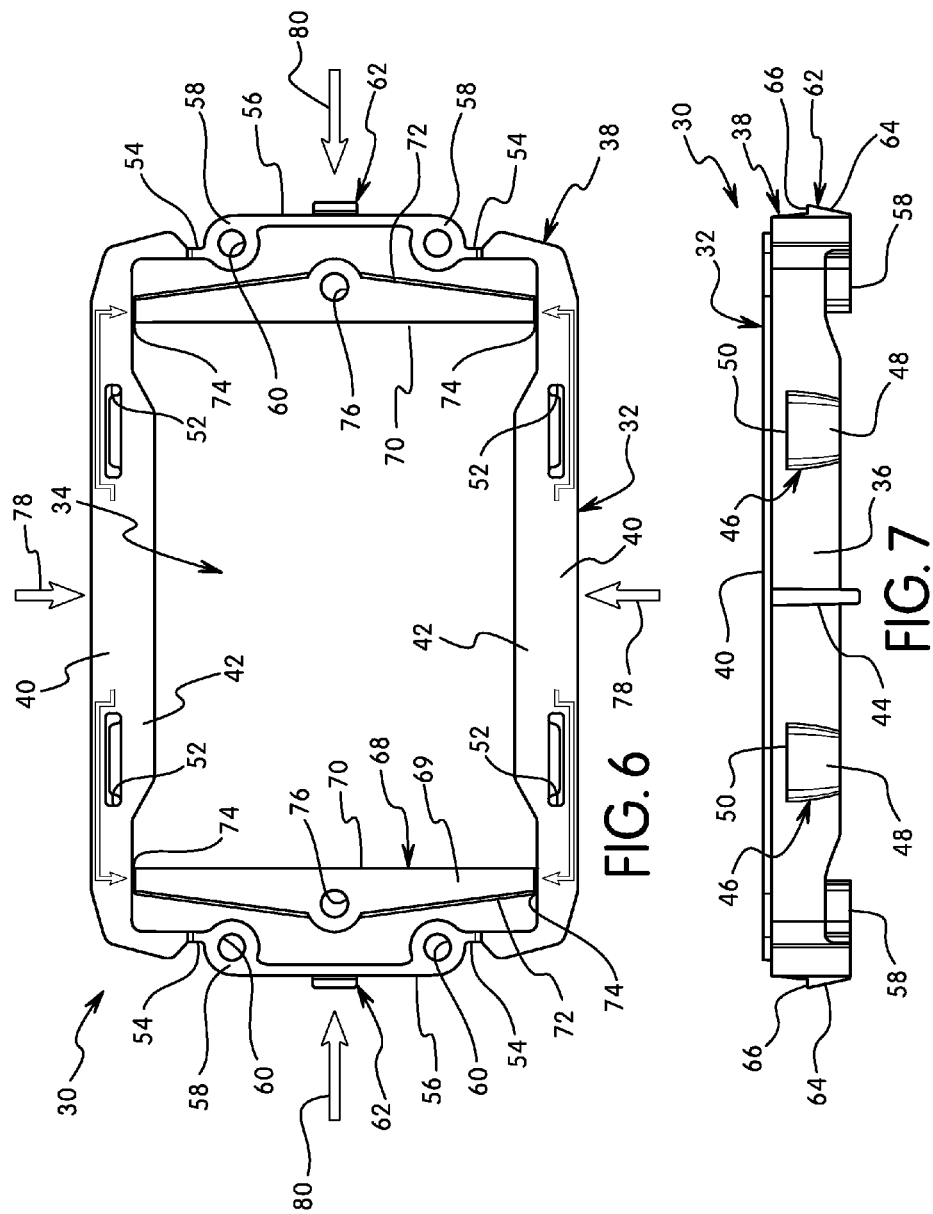

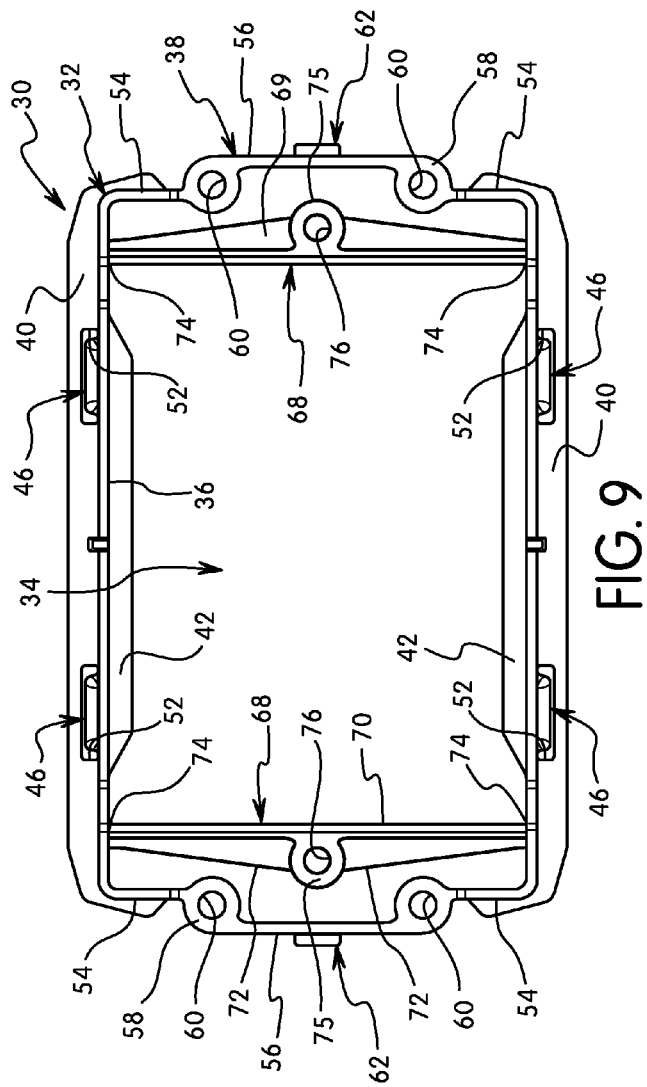
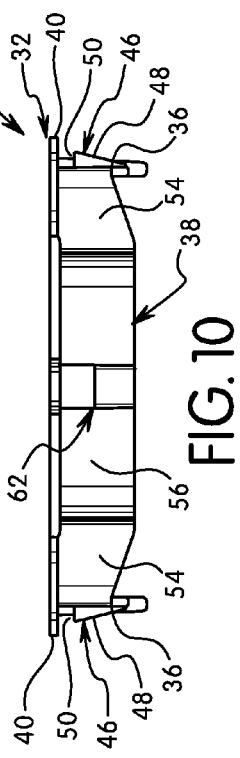

US 8,629,349 B2

ELECTRICAL ASSEMBLY AND ADAPTER FOR WIRING DEVICE

FIELD OF THE INVENTION

The present invention is directed to an electrical assembly for coupling an electrical component to a support. In particular, the invention is directed to an adapter for mounting a wiring device to a wall or floor box.

BACKGROUND OF THE INVENTION

Electrical components such as wiring devices are often mounted to a support or to a housing. For example, wiring devices can be mounted to the wall of a housing of an electric assembly. Wiring devices are also mounted to floor boxes and wall boxes.

The support can be the wall of a housing or recessed box where the wiring device is recessed with respect to the face of the support. The support typically has an opening cut in the face of the support. In certain types of devices, the wiring device can be mounted directly to the surface of the support. Some electrical devices, such as electrical receptacles, must be mounted in an electrical junction box. The electrical junction box must be mounted to a recess in the apparatus.

Various mounting devices have been developed for mounting electrical devices to a support. One example is disclosed in U.S. Pat. No. 6,376,770 to Hyde. This patent discloses a quick connecting universal electrical box and wiring system. The system includes a mounting frame and an electrical box. The electrical box can be pre-wired. The mounting frame is inserted into an opening in the wall, followed by insertion of the electrical box into the frame. The mounting frame has flaps that engage the wall and lock the frame in place when the electrical box is inserted into the frame.

U.S. Pat. No. 2,703,662 to Meyer relates to a switch housing retainer. The retainer includes a body having spring fingers for gripping the switch and outwardly extending leg portions that engage the wall. The body snaps into the opening in the wall and the switch snaps into the frame.

U.S. Pat. No. 2,180,598 to Mahan relates to a holder for an electrical switch. The holder includes flanges that extend outward to contact the wall and an inner flange for coupling with the switch.

U.S. Pat. No. 5,238,426 to Arnett relates to a universal patch panel for communications use in buildings. The panel includes a plurality of connectors. An adapter fits into the openings in the panel to receive the connector. The adapter has two cantilevered arms with wedge shaped tabs to attach to the panel. The connector has wedge shaped tabs that couple with the adapter.

U.S. Pat. No. 3,446,467 to Bailey et al. relates to a device for mounting electrical components to a panel. The mounting device has a two piece structure where each piece has a substantially U-shape. The legs of the U-shaped piece have teeth that engage complementing teeth on the electrical component. An outwardly extending inclined tab engages the opening in the assembly.

Various devices have also been provided for mounting an electrical box to a wall. These devices generally include an adapter device that is inserted into an opening in the wall. The electrical box is then attached to the adapter. Examples of these types of devices are disclosed in U.S. Pat. No. 2,514,176 to Borkowski, U.S. Pat. No. 2,992,754 to Grimes, U.S. Pat. No. 3,963,204 to Liss, U.S. Pat. No. 4,183,486 to Esoldi, U.S. Pat. No. 4,847,444 to Holland, U.S. Pat. No. 5,239,132 to Bartow, and U.S. Pat. No. 6,369,322 to Gretz.

These devices have been generally suitable for the intended use. However, there is a continuing need in the industry for improved mounting devices.

SUMMARY OF THE INVENTION

The present invention is directed to an electrical assembly for attaching to a support. The invention is particularly directed to an adapter for coupling an electrical component to a support.

Accordingly, one aspect of the invention is to provide an electrical assembly that can be easily and quickly connected to a support structure such as the wall of a housing or the wall of a recessed floor or wall box. In one embodiment, the support structure has an opening with a dimension to receive the electrical assembly.

Another aspect of the invention is to provide an adapter for an electrical component or wiring device that is inserted into an opening in the wall of a wall box, floor box or other housing. The adapter is able to receive an electrical component such as a wiring device and mount the electrical component to the support. In one embodiment, the adapter has hooks or barbs to snap into the opening.

Still another aspect of the invention is to provide an adapter that is made of plastic that has flexible side walls to snap into an opening formed in a support.

A further aspect of the invention is to provide an adapter for attaching an electrical component to a support where the adapter has a central opening that is able to accommodate different sizes of wiring devices.

Another aspect of the invention is to provide an adapter for mounting an electrical component to a support where the adapter has a central opening for receiving the electrical component and where the dimensions of the opening can be modified.

The adapter of the invention is preferably made of a molded plastic material where the adapter has a flexible frame for inserting into an opening of a support and where the frame has a central opening with a dimension for receiving a wiring device or other electrical component. In one embodiment, the frame has at least one removable tab in the central opening of the frame. The removable tab reduces the effective dimension of the central opening. The tab has a coupling member for coupling with the wiring device. The tab can be removed to enlarge the effective area of the central opening to receive a larger electrical device or standard electrical junction box. The frame has a coupling member for coupling with the larger electrical component.

These and other aspects of the invention are basically attained by providing an electrical assembly comprising an electrical component and a support member for supporting the electrical component where the support member has an opening with a dimension for receiving the electrical component. An adapter is received in the opening for coupling the electrical component to the support member. The adapter has a frame with a plurality of coupling members defining a connection of the frame to the opening of the support member. The frame has a central opening adapted for receiving at least two different dimensions of the electrical component.

The various aspects and advantages of the invention are also attained by providing an adapter for coupling an electrical component to a support. The adapter comprises a frame having an outer dimension for inserting into an opening in the support, the frame having a central opening, and a first removable tab removably coupled to the frame. The removable tab is positioned for mounting a first electrical component in the central opening. The first removable tab is removable to define the central opening having a dimension to receive a second electrical component having a dimension greater than a dimension of the first electrical component.

The aspects of the invention are further attained by providing an adapter for coupling an electrical component to a support. The adapter comprises a frame having an outer dimension adapted for inserting into an opening of the support. The frame has first and second side walls and first and second end walls extending between the side walls. Each of the side walls and end walls have at least one coupling member adapted for coupling with the opening of the support. The frame is sufficiently flexible to snap into the opening. The end walls have a plurality of apertures adapted for receiving screws for coupling the electrical component to the frame.

These and other aspects and advantages of the invention will become apparent from the following detailed description of the invention and the annexed drawings which disclose various embodiments of the invention.

BRIEF DESCRIPTION OF THE DRAWINGS

The following is a brief description of the drawings, in which:

FIG. 3 is a side view of the recessed wall box of FIG. 1;

FIG. 4 is a perspective view of the recessed wall box of FIG. 1 showing the cover removed;

FIG. 6 is a top plan view of the adapter of FIG. 5;

FIG. 7 is a side view of the adapter of FIG. 5;

FIG. 9 is a bottom view of the adapter of FIG. 5;

FIG. 10 is an end view of the adapter of FIG. 5;

DETAILED DESCRIPTION OF THE INVENTION

Figure 2:
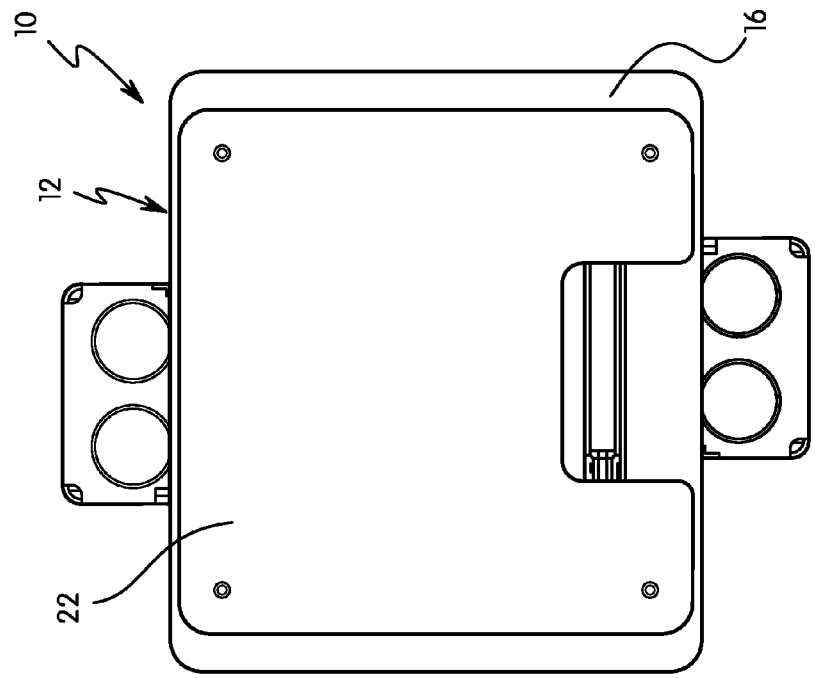
FIG. 2 is a front elevational view of the recessed wall box of FIG. 1.
Figure 1:
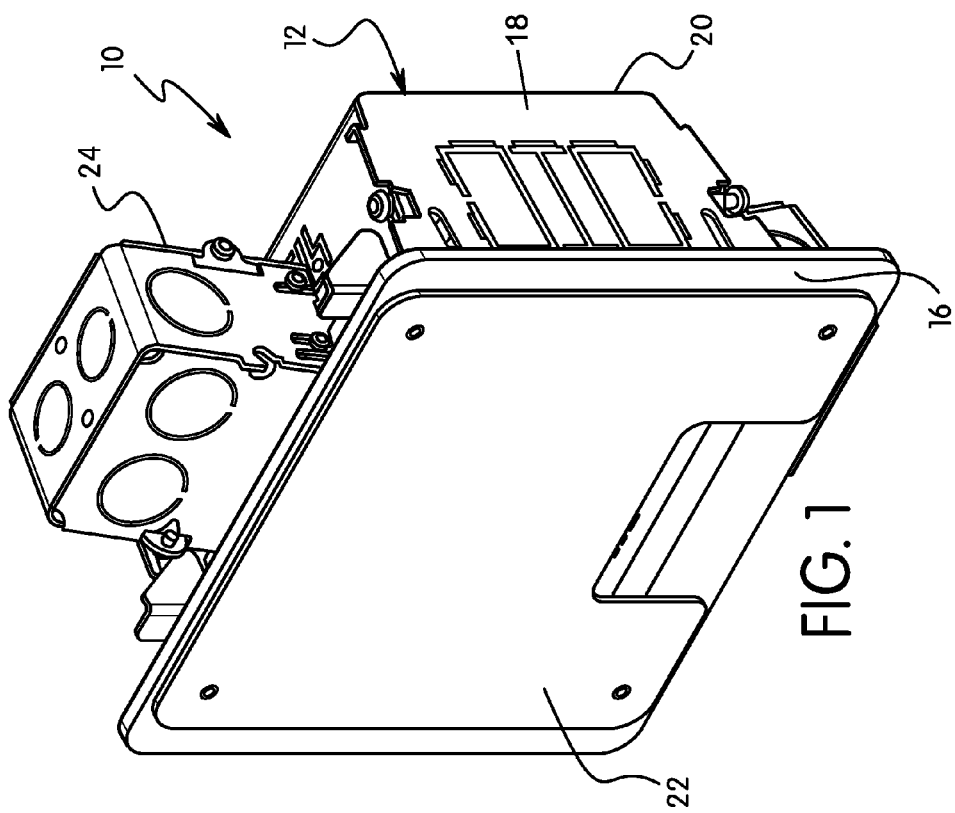
FIG. 1 is a perspective view of a recessed wall box in one embodiment of the invention.

The present invention is directed to an electrical assembly for supporting an electrical component. The invention is also directed to an adapter for mounting an electrical component to a support.

In one embodiment shown in FIGS. 1-4, an electrical assembly 10 includes a recessed electrical box 12 defining a support for an electrical component 14 and an adapter for coupling the electrical component to the electrical box. In the embodiment illustrated, recessed box 12 includes a top wall 16 for contacting the outer surface of a wall or floor, side walls extending from the top wall and a bottom wall 20. A removable cover 22 is provided for enclosing the internal cavity of the recessed box. Side walls 18 in the embodiment shown have an opening for mounting an electrical junction box 24 or wiring device. The recessed electrical box 12 is typically recessed in a wall surface or in a floor. In other embodiments, the support for the electrical components can be a wall or panel of a housing of an electrical apparatus.

Referring to FIGS. 5-10, an adapter 30 is provided for mounting an electrical component within the opening in a support structure such as the wall of the recessed box 12. Adapter 30 is preferably a one-piece unitary structure made of a plastic material that is sufficiently rigid to support an electrical component and to be sufficiently flexible to be inserted into the opening in the support. In other embodiments, the adapter can be made of metal that can be attached to the support by suitable fastening members.

Adapter 30 includes an outer frame 32 having a central opening 34 for receiving an electrical component. Frame 32 includes opposite side walls 36 and opposite end walls 38 extending between the side walls. Side walls 36 have an outwardly extending flange 40 and an inwardly extending flange 42. As shown in FIG. 6, the outwardly extending flange extends around the corner to partially overlie the end walls. In this embodiment, a portion of the flange extends from end portions of the end walls. Frame 32 has an outer dimension to fit into the opening in the support. The outwardly extending flange 40 has a dimension to contact the outer surface of the support to retain the frame in place and prevent the frame from passing completely through the opening.

Figure 5:
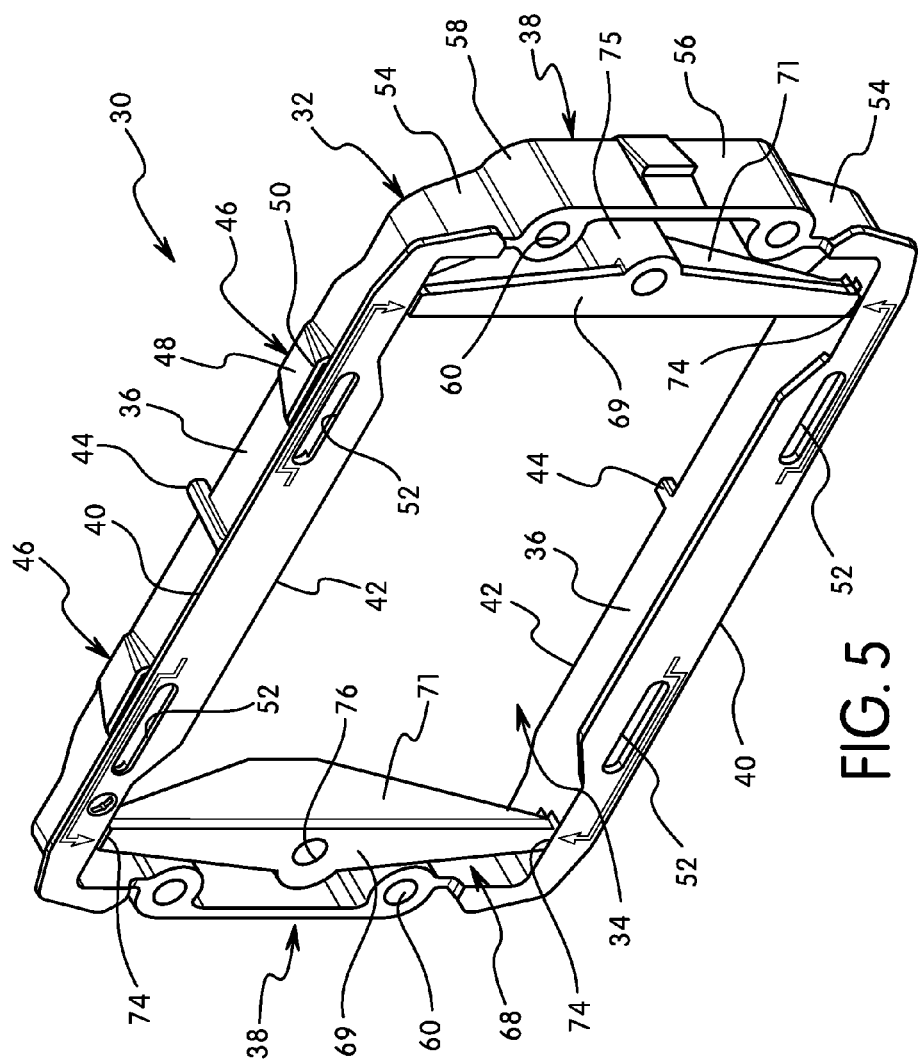
FIG. 5 is a top perspective view of the adapter in one embodiment of the invention.
Figure 8:
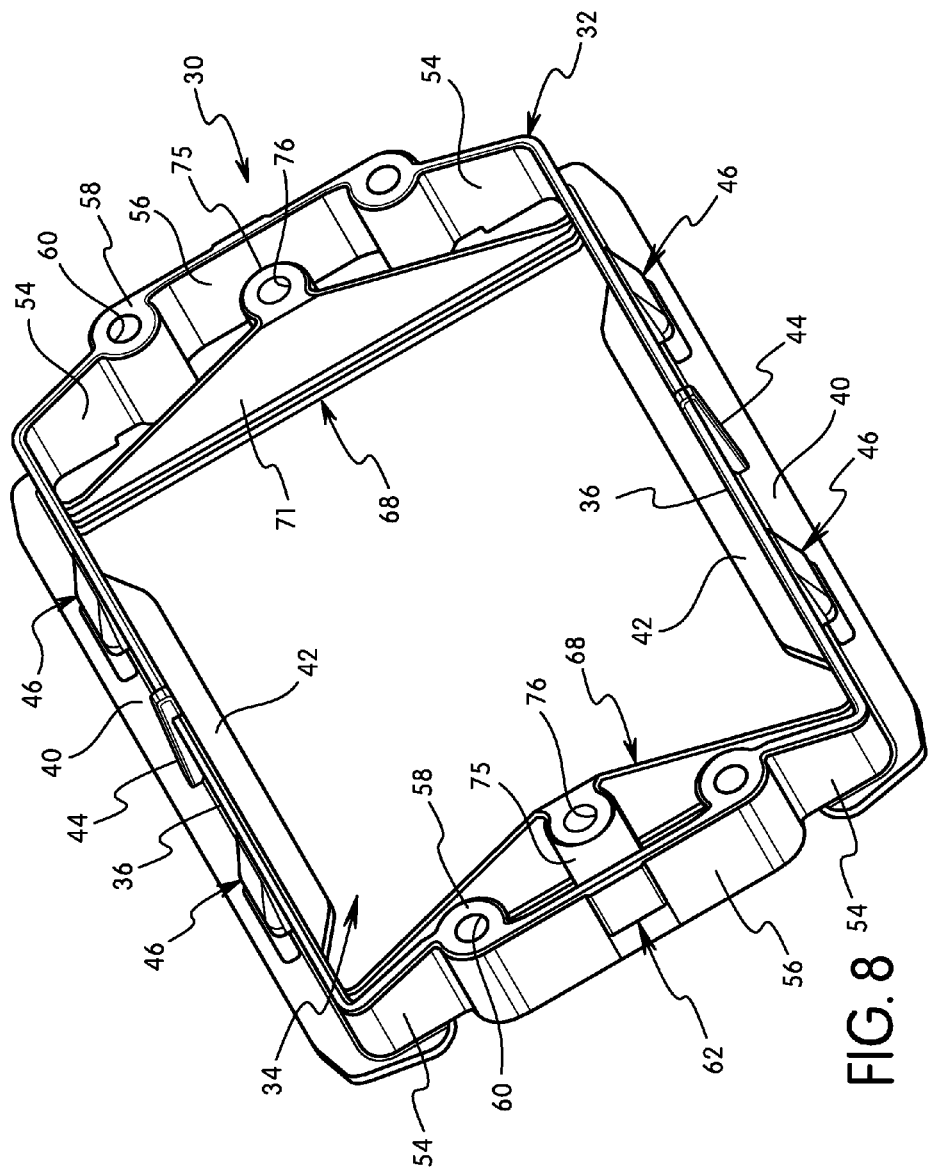
FIG. 8 is a bottom perspective view of the adapter of FIG. 5.
Figure 11:
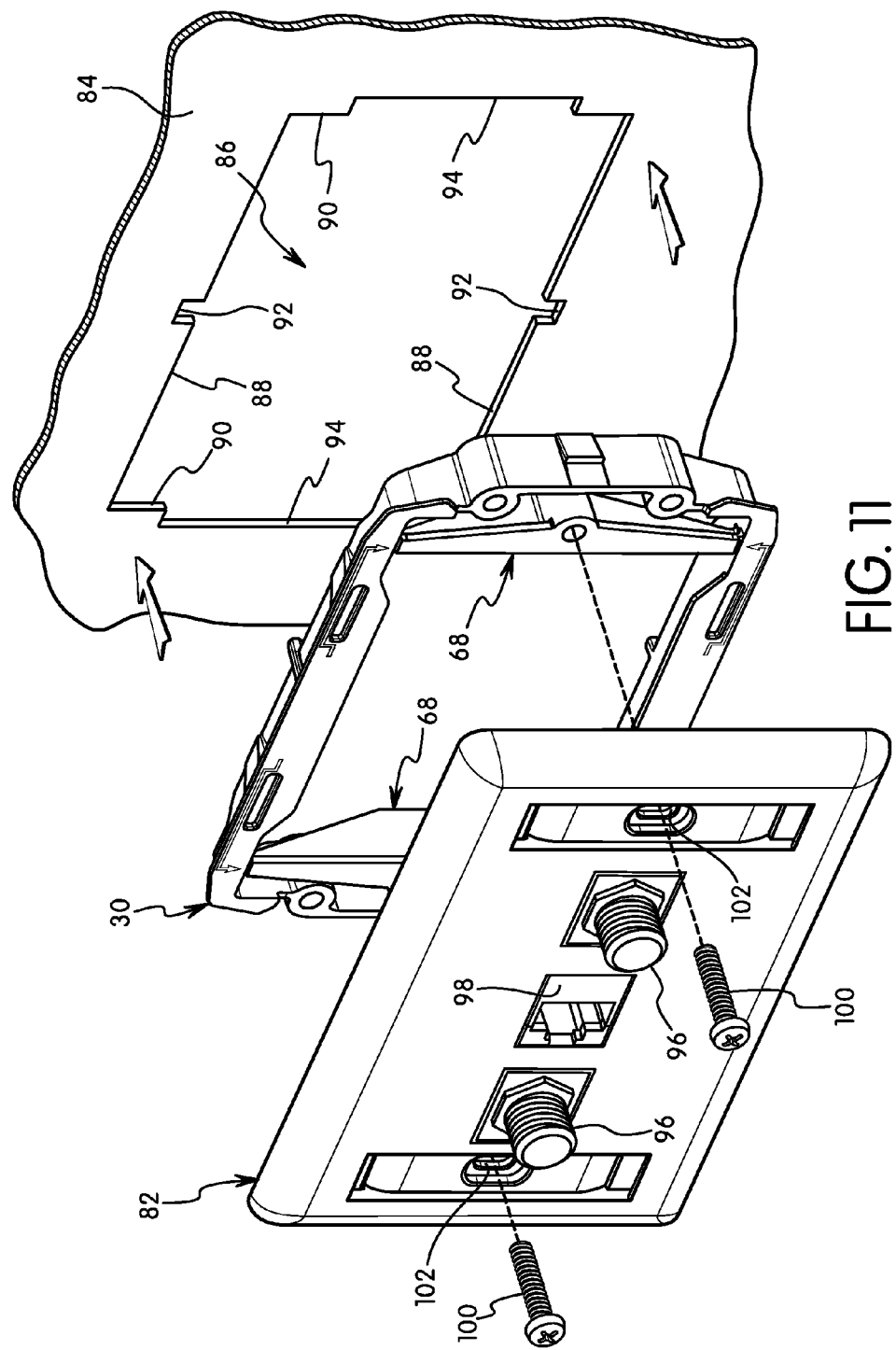
FIG. 11 is an exploded view of the recessed wall box and adapter receiving a low voltage wiring device.

Side walls 36 as shown in FIG. 7 include an outwardly extending detent 44 forming a key that mates with a corresponding recess 92 in the opening of the support as shown in FIG. 11. Each side wall 36 preferably includes two spaced apart coupling members 46. The coupling members in the embodiment illustrated have a generally wedge shape with an inclined face 48 and an upper shoulder 50 defining a hook or barb-like member. The inclined face 48 is inclined outwardly from a bottom edge of side wall 36 towards the top edge adjacent the outwardly extending flange 40. In a preferred embodiment, the space between shoulder 50 and the bottom side of outwardly extending flange 40 is equal to the thickness of the support. As shown in FIGS. 5 and 6, elongated slots 52 are provided in the outwardly extending flange 40 aligned with the coupling members 46. The inclined faces 48 are angled to slide into the opening of the support and snap into the opening to couple the frame to the support. The shoulder 50 has a width to engage the end of the support at the opening.

End walls 38 extend between the opposite side walls. End walls 38 have a first portion 54 extending from the side walls and a second middle portion 56 spaced outwardly from the first portions 54 and joining the first portions. Two spaced apart lugs 58 having an aperture 60 are provided between the respective first portions and the second portion. The aperture 60 and lugs 58 are oriented to receive a mounting screw of an electrical component as discussed in further detail below. The first portions 54 and the lugs 58 at each end of frame 32 are spaced apart a distance corresponding to the longitudinal length of an electrical component and particularly to the longitudinal length of a standard electrical junction box. The lugs 58 and the corresponding apertures 60 are at each end of frame 32 a distance corresponding to the orientation of the mounting screws of the electrical junction box.

The outer surface of end walls 38 include a coupling member 62 for coupling with the opening in the support. As shown in FIG. 7, coupling members 62 have an inclined face 64 that diverge outwardly from the bottom edge towards the top edge of the end walls and an upper shoulder 66. The inclined face 64 is at an angle to slide through the opening in the support. The upper shoulder 66 has a width to engage the edge of the opening to retain the adapter in the opening.

Removable tabs 68 are provided at each end of frame 32 and extend between the opposite side walls 36. As shown in FIG. 6, tabs 68 have a straight inner side 70 and inclined outer sides 72 to define a substantially triangular shape. Tabs 68 are defined by top portion 69 lying in the plane of the frame 32 and downwardly extending side portion 71 at the inner side 70. As shown in FIG. 5, side portion 71 has a substantially triangular shape. Tabs 68 are coupled to the inner edge of the central opening 34 by frangible end portions 74. Tabs 68 include a centrally located lug 75 having an aperture 76 for receiving a mounting screw for mounting an electrical component. Side walls 36 and end walls 38 are sufficiently flexible to bend inwardly in the direction of arrows 78 and 80, respectively, to allow insertion of the adapter into the opening in the support.

In the embodiment shown in FIG. 11, adapter 30 is provided for mounting a low voltage wiring device 82 to a support 84. The support 84 can be a panel of an electrical device or a side wall of a recessed wall or floor box as shown in FIGS. 1-4. Support 84 has an opening 86 with a dimension to receive adapter 30. As shown in FIG. 11, opening 86 has a substantially rectangular shape with side edges 88 and end edges 90. Side edges 88 include a notch 92 aligned with the detent 44 on the adapter 30. The end edges 90 include a recessed portion 94 for receiving the middle portion 56 of end wall 38.

Adapter 30 is positioned in the opening 86 by a snap connect provided by the coupling members 46 and 62. The inclined edges of the coupling members slide over the inner edge of opening 86 until the shoulder of the respective coupling members snaps into position against the surface of the support. Side walls 36 and end walls 38 are sufficiently flexible to deflect inwardly as the adapter 30 is snapped into position in the opening 86 and to spring outwardly to be securely coupled to the support within the opening.

In the embodiment illustrated, wiring device 82 is a low voltage device having threaded couplings 96 for coaxial cables and a receptacle 98 for communication lines. Low voltage wiring devices generally have a dimension smaller than other electrical wiring devices. As shown in FIG. 11, coupling screws 100 pass through corresponding openings 102 in wiring device 82 and are threaded into the aperture 76 of the removable tabs 68. In the event it is necessary to remove the adapter 30 from the support 84, a tool such as a screwdriver can be inserted into the slots 52 in the outwardly facing flanges 40 to separate the coupling members 46 from the inner edge of the opening 86.

Figure 12:
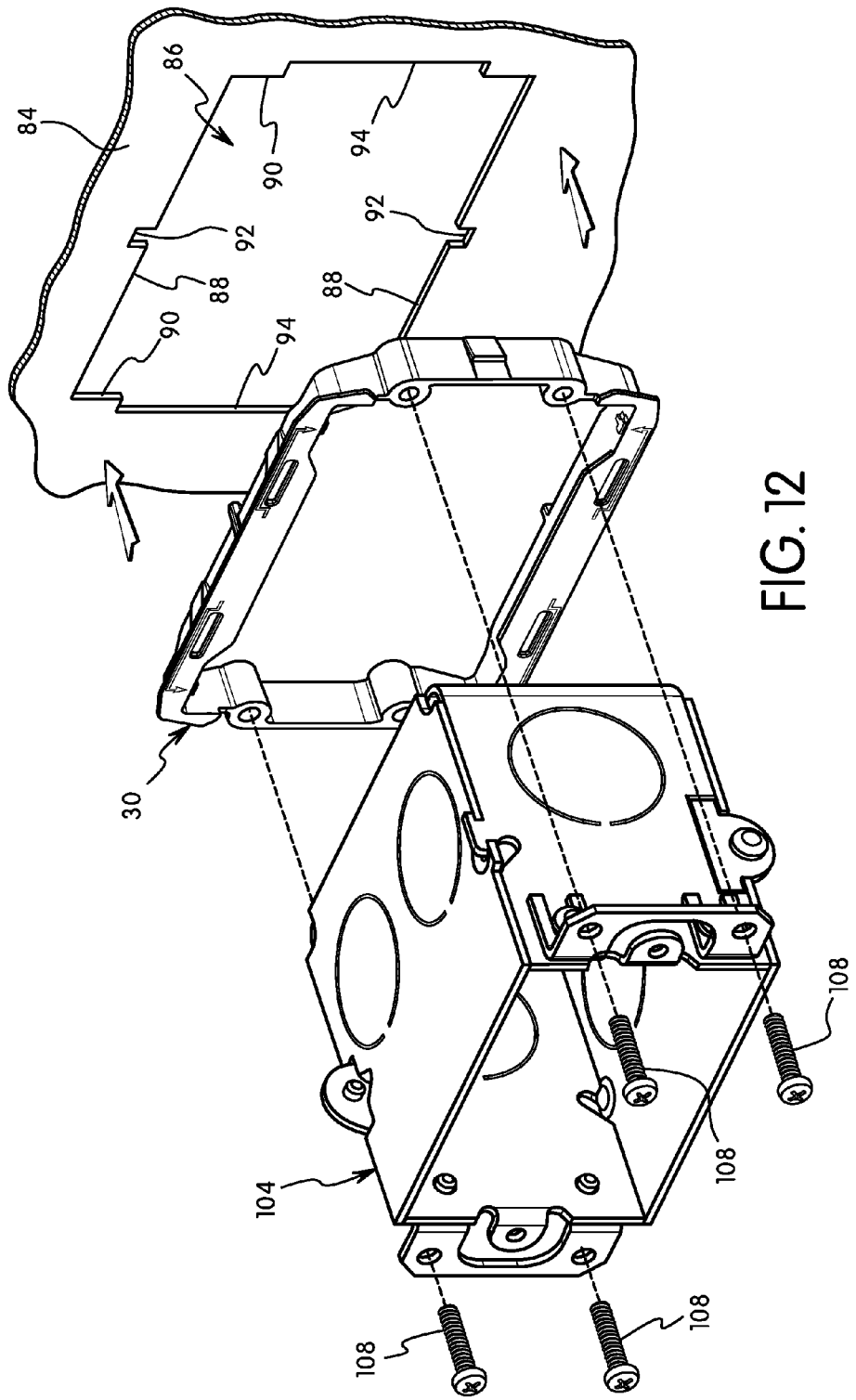
FIG. 12 is an exploded view of the recessed wall box and adapter receiving an electrical junction box.
Figure 14:
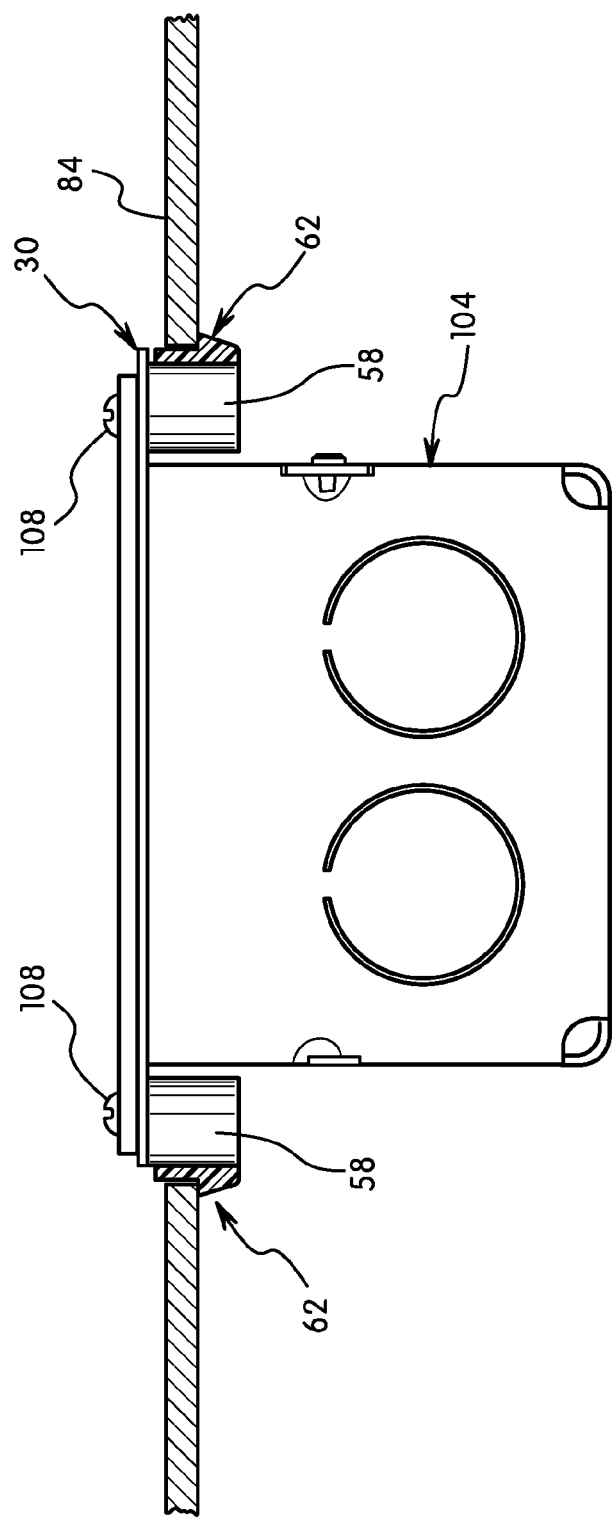
FIG. 14 is a cross-sectional side wall of the adapter and electrical junction box.

Referring to FIG. 12, adapter 30 can be modified to receive a second electrical component such as an electrical junction box 104 that has a dimension greater than the dimension of the wiring device 82. Tabs 68 are removed by bending, twisting or cutting to enlarge the central opening 34 of adapter 30. The resulting central opening as shown in FIG. 12 has a dimension to receive the electrical junction box 104. The electrical junction box 104 is preferably a standard junction box having mounting tabs 106 and mounting screws 108. Screws 108 align with the apertures 60 in end walls 38 as shown in FIGS. 12 and 14.

Figure 13:
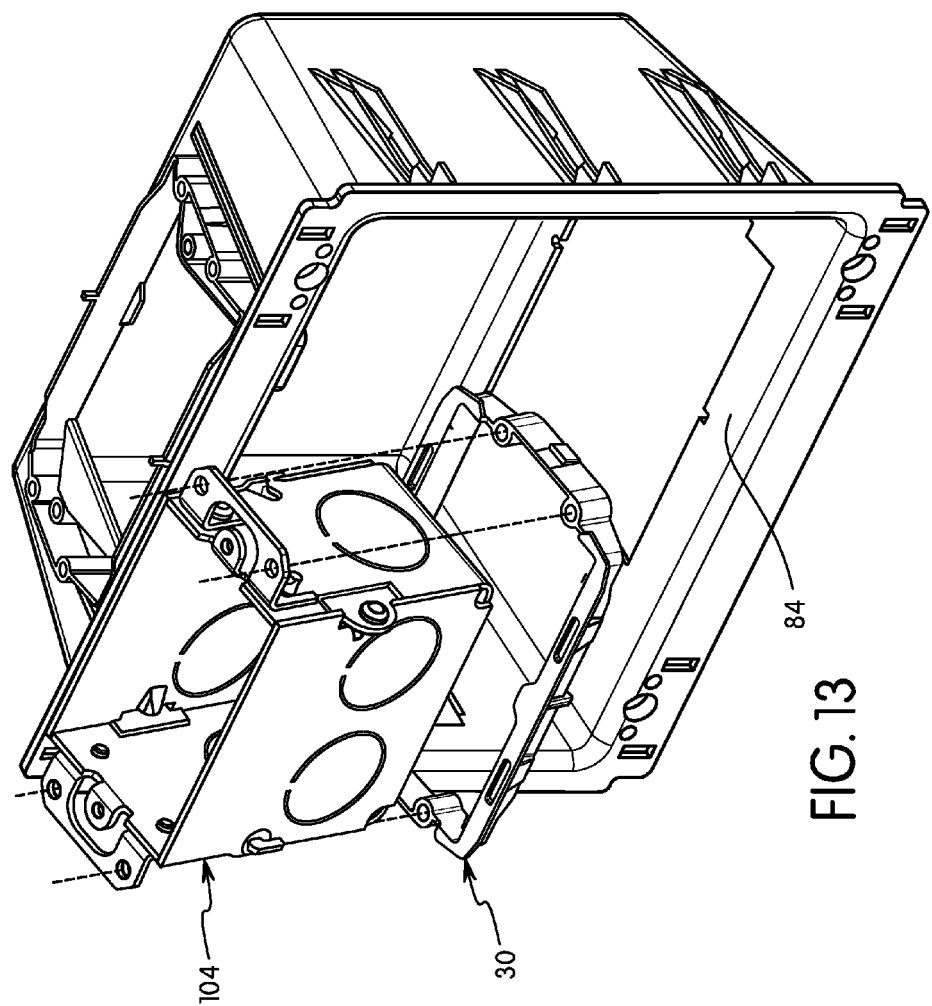
FIG. 13 is an exploded view of the recessed wall box showing one adapter for receiving an electrical junction box and a second adapter for receiving a low voltage wiring device.

As shown in the drawings, adapter 30 has a dimension to snap into a suitable support such as the wall of a recessed box and is able to support electrical components having different sizes. The removable tabs provide a dimension of the central opening of the adapter to accommodate and support an electrical wiring device having a first dimension. The removable tabs can be removed from the adapter to enlarge the central opening to accommodate a larger electrical component such as the electrical junction box shown in the embodiment of FIGS. 12-14. The electrical junction box can then support a suitable wiring device such as a duplex receptacle or switch in a standard mounting arrangement. Suitable wiring is supplied to the electrical junction box and connected to the wiring device in a standard manner.

The removable tabs in the embodiment illustrated extend between the side walls. In alternative embodiments, the removable tabs can be removably coupled to other portions of the adapter such as the end walls. The removable tabs are preferably joined to the adapter by a weakened area that can be broken by twisting or prying the removable tab with respect to the frame of the adapter. In other embodiments, the removable tab can be removed by cutting or sawing, as desired.

While various embodiments have been chosen to illustrate the invention, it will be understood by those skilled in the art that various changes and modifications can be made without departing from the scope of the invention as defined in the appended claims.

What is claimed is:

1. An electrical assembly comprising:
   an electrical component;
   a support for supporting the electrical component and having an opening with a dimension for receiving the electrical component;
   an adapter received in said opening for coupling the electrical component to the support, said adapter having a frame with opposite side walls and opposite end walls extending between said side walls, and a plurality of coupling members for connecting said frame to said opening of said support, said frame having a central opening with a first removable tab coupled to said opposite side walls of said frame by a frangible portion, said frame having a first aperture for receiving a first mounting screw for mounting said electrical component and said first removable tab having a second aperture for receiving a second mounting screw of a second electrical component;
   said first removable tab is coupled to said frame at a first end of said frame;
   a second removable tab coupled to said opposite side walls of said frame by frangible portions at a second end of said frame,
   said first and second removable tabs being spaced apart a distance to define a central opening having a dimension for receiving a wiring device, and where said tabs are adapted to be removed to define said central opening in said frame having a dimension for receiving an electrical junction box.

2. The electrical assembly of claim 1, wherein said support is an electrical box adapted for recessing in a wall or floor, said electrical box having a wall with said opening formed therein.

3. The electrical assembly of claim 1, wherein said first electrical component is a low voltage wiring device.

4. The electrical assembly of claim 1, wherein said coupling members define a snap connection for coupling said frame to said support member.

5. The electrical assembly of claim 1, wherein said frame includes at least one snap connector for inserting through an opening in said support member; and where said side walls and end walls are sufficiently flexible to enable said side walls and end walls to deflect for coupling said snap connector to said support member.

6. An adapter for coupling an electrical component to a support, said adapter comprising:
   a frame having opposite side walls and opposite first and second end walls extending between said side walls with an outer dimension for inserting into an opening in the support, said frame having a central opening, each of said side walls and end walls include a connector for coupling said adapter within the opening of the support, said end walls include screw holes spaced apart a distance for receiving mounting screws of an electrical junction box;

a first removable tab removably coupled to said frame by a frangible portion, said removable tab being positioned in said central opening of said frame for mounting a first electrical component in said central opening having a first dimension;

said first removable tab being removable to define said central opening having a dimension to receive the electrical junction box having a dimension greater than a dimension of said first electrical component.

7. The adapter of claim 6, wherein
said side walls and end walls are sufficiently flexible to deflect while coupling said frame to said support.

8. The adapter of claim 6, wherein
said frame has a top edge and a flange extending outwardly from said top edge to contact an outer surface of said support.

9. The adapter of claim 6, wherein
said first removable tab is spaced inwardly from an inner edge of said first end walls of said frame.

10. The adapter of claim 6, wherein
said first removable tab extends between said side walls and is spaced inwardly from said first end wall, said frame further comprising
a second removable tab extending between said side walls and spaced inwardly from said second end wall; and
said first tab and second tab positioned for supporting a first electrical component in said central opening.

11. The adapter of claim 10, wherein
said first removable tab and second removable tab are removable to define said central opening with a dimension to receive said second electrical component having a dimension greater than said first electrical component.

12. The adapter of claim 11, wherein
said first and second end walls are positioned to support said second electrical component.

13. An adapter for coupling an electrical component to a support, said adapter comprising:
a frame having an outer dimension adapted for inserting into an opening of the support, said frame having first and second side walls and first and second end walls extending between said side walls forming a central opening for the electrical component, each of said side walls and end walls having at least one coupling member adapted for coupling with the opening of the support, said frame being sufficiently flexible to snap into the opening;

a first removable tab extending between and coupled to said side walls by a frangible portion and spaced from said first end wall, said first tab having a coupling for coupling to an electrical device; and a second removable tab extending between and coupled to said side walls by a frangible portion and spaced from said second end, said second tab having a coupling for coupling to the electrical device;

said end walls of said frame having a plurality of apertures adapted for receiving screws for coupling a component to said adapter within the central opening, said first and second tabs are coupled to said side walls by a frangible connection whereby said tabs are removable from said frame for enlarging said central opening; and where said apertures in said end walls are adapted for coupling to the electrical component when the tabs are removed.

14. The adapter of claim 13, wherein
said coupling on said tabs is a screw hole for receiving a coupling screw; and
said coupling on said end walls is a screw hole for receiving a coupling screw.

15. An electrical assembly for supporting an electrical component, comprising:
a support having a central opening with inner side edges and inner end edges, a first removable tab extending between said side edges at a first end of said central opening, and coupled to said inner edge of the central opening by frangible portions, said first removable tab being spaced from said first end, and a second removable tab extending between said side edges at a second end of said central opening and coupled to said inner edges of the central opening by frangible portions, said second removable tab being spaced from said second end, each of said removable tabs having a centrally located aperture for receiving a mounting screw for mounting a low voltage wiring device to the support, and where the support has a plurality of apertures at each end edge for receiving a mounting screw for mounting an electrical component.

16. The electrical assembly of claim 15, wherein
said first and second removable tabs are removable for enlarging said central opening.

17. The electrical assembly of claim 15, wherein
said support is defined by a frame having side walls and end walls extending between said side walls, and where said first and second removable tabs are coupled to said side walls by said frangible portions.

18. The electrical assembly of claim 15, wherein
said first removable tab and said second removable tab have a substantially straight inner side facing inwardly with respect to said central opening and an outwardly facing lug having said centrally located aperture.

* * * * *